Figure 1:
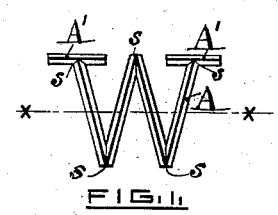
Figure 2:
Figure 3:
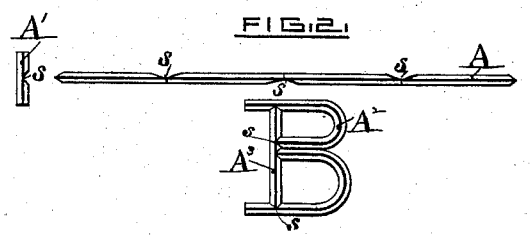
Figure 4:
Figure 5:
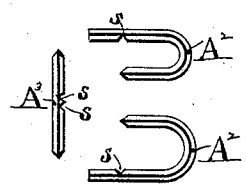
Figure 6:
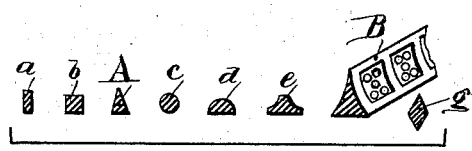
Figure 1:
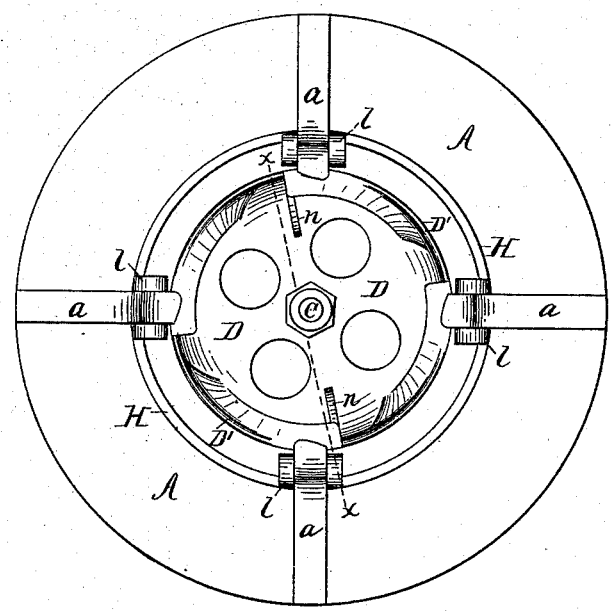
Figure 2:
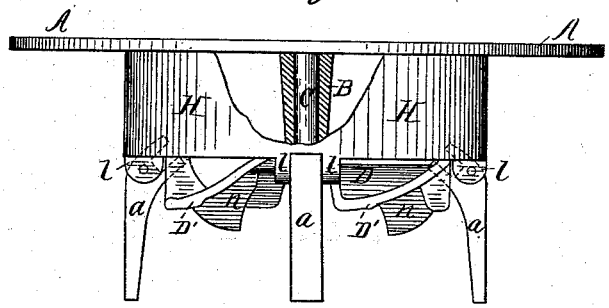
Figure 4:
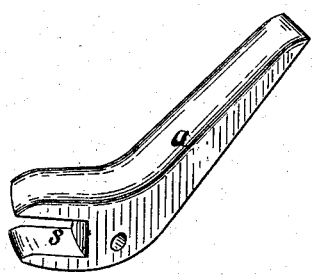
Figure 3:
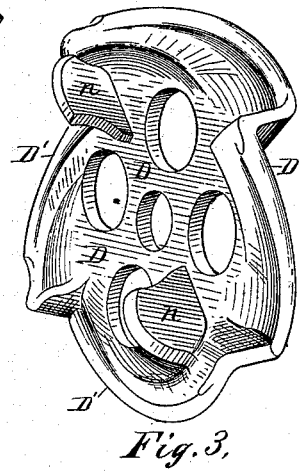
Figure 5:
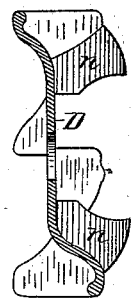

(No Model.)

A. B. CASE.
INITIAL LETTER, &c.

No. 263,681. Patented Sept. 5, 1882.

WITNESSES:
John P. Burkis
Gilman E. Jopp

INVENTOR:
Asahel B Case (No Model.)

O. R. CHAPLIN.
SPOOL FOR HOLDING WIRE.

No. 263,682. Patented Sept. 5, 1882.